(12) United States Patent
Lee et al.

(10) Patent No.: US 8,289,525 B2
(45) Date of Patent: Oct. 16, 2012

(54) OPTICAL SURFACE MEASURING APPARATUS AND METHOD

(75) Inventors: Seung-Yop Lee, Seoul (KR); Kyoung Up Kim, Seoul (KR); Jae Hyun Kim, Seoul (KR); Kyuman Cho, Seoul (KR); Young Kyu Park, Incheon (KR)

(73) Assignee: Industry-University Cooperation Foundation Sogang University, Seoul (KR)

( * ) Notice: Subject to any disclaimer, the term of this patent is extended or adjusted under 35 U.S.C. 154(b) by 524 days.

(21) Appl. No.: 12/561,671

(22) Filed: Sep. 17, 2009

(65) Prior Publication Data

US 2010/0220337 A1 Sep. 2, 2010

(30) Foreign Application Priority Data

Feb. 27, 2009 (KR) .................. 10-2009-0017175

(51) Int. Cl.
*G01B 11/02* (2006.01)
(52) U.S. Cl. ...................................... 356/516
(58) Field of Classification Search .............. 356/73, 356/496, 511, 516, 601, 609
See application file for complete search history.

(56) References Cited

U.S. PATENT DOCUMENTS

| 5,208,451 | A | * | 5/1993 | Deck | 250/201.3 |
| 5,247,165 | A | * | 9/1993 | Hiruta et al. | 250/201.3 |
| 6,677,565 | B1 | * | 1/2004 | Wahl et al. | 250/201.3 |
| 7,247,827 | B1 | * | 7/2007 | Hwang et al. | 250/201.5 |
| 2009/0261233 | A1 | * | 10/2009 | Tamiya et al. | 250/201.2 |
| 2010/0225926 | A1 | * | 9/2010 | van Amstel et al. | 356/511 |

OTHER PUBLICATIONS

Cohen, Donald K. et al. "Automatic focus control: the astigmatic lens approach". Applied Optics, vol. 23, No. 4, Feb. 15, 1984, pp. 565-570.*
Yin, Chunyong et al.: "New advance in confocal microscopy", *Meas. Sci. Technol.*, 17, 2006, pp. 596-600.

* cited by examiner

*Primary Examiner* — Michael A Lyons
(74) *Attorney, Agent, or Firm* — Frommer Lawrence & Haug LLP; Ronald R. Santucci

(57) ABSTRACT

Disclosed herein is an apparatus and method which is capable of accurately measuring surface status, such as a minute variation in height (the height difference), a protrusion, a depression, surface damage and/or surface roughness, at each point on the surface of the object to be measured in an optical manner. In particular, the present invention provides an optical surface measuring apparatus and method which is capable of accurately measuring the minute surface status of the object to be measured using both a signal from an interferometer and a Focus Error (FE) signal from a Position Sensitive Detector (PSD) in order to overcome the $2\pi$-ambiguity of the conventional interferometers and the limitation of the Focus Error (FE) signal.

10 Claims, 7 Drawing Sheets

S:Focal Point of Two Lenses  F =(A+B)−(C+D)
M:Focal Point of Sensor Lens  (0:On Focus, +:Too Far)
F:4D-PD Position

[2π-ambiguity of interference]

(PRIOR ART)

[conventional solution to 2π-ambiguity]

[relationship between measurable height and signal]
(PRIOR ART)

OPTICAL SURFACE MEASURING APPARATUS AND METHOD

This application claims priority benefits of Korean Patent Application No. 10-2009-0017175 filed Feb. 27, 2009, the disclosure of which is hereby incorporated by reference.

BACKGROUND OF THE INVENTION

1. Field of the Invention

The present invention relates generally to an optical surface measuring apparatus and method, and, more particularly, to an apparatus and method which is capable of accurately measuring surface status, such as a minute variation in height (the height difference), a protrusion, a depression, surface damage and/or surface roughness, at each point on the surface of the object to be measured in an optical manner.

2. Description of the Related Art

In general, when optical parts, wafers or glass products are manufactured, Fizeau interferometers and point-diffraction interferometers based on the principle of interference are used to measure the shapes of manufactured products.

Such optical measuring apparatuses using interferometers can accurately measure variation in height (the height difference) of the surface of an object to be measured. However, in general, the height can be measured up to ¼ of wavelength $\lambda$ due to interference without use of any correction.

For example, in the case of a helium-neon laser with a wavelength of 632 nm, a critical point appears near about 150 nm, and from FIG. 7, it can be seen that a repetitive pattern appears at a height of about 150 nm. This phenomenon is referred to as $2\pi$-ambiguity.

The relationship between phase and distance and the $2\pi$-ambiguity of a reflective interferometer will be described in more detail below.

When a reference surface (the height difference reference=0 nm) is set on a specimen to be measured, such as that shown in FIG. 8, and measurement is performed using an interferometer, an interference signal is represented as a function of signal light and reference light, and may be generally expressed by the following Equation 1:

$$I_{Interference} = I_{Sig} + I_{ref} + 2\sqrt{I_{ref}I_{Sig}} \sin(\Delta\phi+\Phi) \quad (1)$$

where $I_{Sig}$ and $I_{ref}$ are the intensities of signal light and reference light (that is, $|E_{Sig}|^2$ and $|E_{ref}|^2$), $\Phi$ is phase difference given by a system, which is a constant value, and $\Delta\phi$ is the optical path difference between signal light reflected from a surface of the specimen and reference light.

Furthermore, the relationship between the phase difference of the interference signal given by the optical path difference and the variation in the distance (the height difference) may be expressed by the following Equation 2:

$$\Delta\varphi = \frac{2\pi}{\lambda} n \Delta L \quad (2)$$

When the variation on the surface of the specimen, that is, the height difference, is measured using the reflective interferometer, the refractive index of air is 1, and the optical path difference is doubled because the relative phase difference causes two optical path differences to be detected both when a laser beam enters into the surface and when the laser beam exits from the surface.

That is, since in FIG. 8, a point where there is no height difference causes the optical path difference to occur both when a laser beam enters into the reference surface and when the laser beam exits from the reference surface, unlike a point where there is the height difference, the resulting optical path difference measured by an actual reflective interferometer is twice the actual height difference.

Accordingly, in the case of the reflective interferometer, the phase variation is doubled, so that variation in the distance (or height difference) based on the phase difference is expressed by the following Equation 3:

$$\Delta L = \frac{\lambda}{4\pi} \Delta\varphi \quad (3)$$

Furthermore, FIG. 9 is a drawing showing an interference signal (values obtained by measuring an interferometer signal using an oscilloscope). From FIG. 9(1), it can be seen that the interference signal is repeated in periods of $2\pi$ because the interference signal has a sine wave form. As a result, in the case of the reflective interferometer, the maximum value of $\Delta\phi$ is $\pi$, so that the maximum variation in the distance is $\lambda/4$. This phenomenon is referred to as $2\pi$-ambiguity.

When the interference signal measured using the interferometer and shown in FIG. 9(1) is calculated using a phase-distance variation equation, it can be represented by the variation in the distance, as shown in FIG. 9(2). FIG. 9(2) shows the values obtained by converting the interferometer signal into time-dependent variation in the distance through calculation.

In general, when the distance between points of measurement on a specific specimen is minimized, the height difference can be decreased indirectly. Accordingly, using this method, a case in consideration is regarded as the case where variation in the distance is equal to or leas than $\lambda/4$, so that the variation in the distance, such as that shown in FIG. 9(2), can be unwrapped using a program, as shown in FIG. 9(3).

This process is referred to as phase unwrapping. However, although a very narrow measuring interval is maintained, only variation equal to or less than $\lambda/4$ can be detected when measurement is performed at a point where variation in the distance (or height difference) is abruptly changed to a value equal to or greater than $\lambda/4$. That is, there is no method of finding the sequential position of a corresponding period.

Currently, various studies and methods have been conducted or proposed to overcome the above-described $2\pi$-ambiguity. Of these methods, a method capable of measuring the longest distance has a maximum measuring range of 10 μm.

A conventional method capable of measuring a maximum of 10 μm will be described briefly below with reference to FIG. 10.

When the quantities of light are measured at the points of measurement, the intensities of light appear as shown in the left view of FIG. 10. When the linear interval is regularly performed, a line having a constant slope passes through a repetitive interference signal, in which case interference can be detected after the number of a point where the same intensity of light is measured has been repeated a predetermined number of times.

However, this conventional method is advantageous in that it is inconvenient to actually use because it is impossible to perform measurement at the focal point, and the maximum range of measurement is about 10 μm.

Furthermore, the case where a distance is measured using a focus error signal (which may be referred to as the "FES" or "FE signal") can have a wide measurable range when the slope is moderate as shown in the left view of FIG. 11. However, a disadvantage arises in that the intensity of a signal generated at every distance is relatively weakened. When the signal is weakened as described above, the Signal Noise Ratio (SNR) is decreased, thus resulting in low resolution.

In contrast, when the slope is steep as shown in the right view of FIG. 11, the intensity of a signal generated at every distance is relatively strengthened, so that the resolution is high. However, a disadvantage arises in that a measurable range is rapidly decreased.

As a result, when a focus error signal is used for a distance measuring apparatus, only an apparatus which has high resolution and is capable of measuring only short intervals or an apparatus which has low resolution and is capable of measuring long intervals can be fabricated.

The above-described conventional method of measuring distance using an FE signal is disadvantageous in that the measurable range and corresponding resolution are inversely related to each other. The conventional method using interference has a high resolution up to the sub-nano level, but can measure about 160 nm corresponding to ¼ of laser wavelength at a focal point in the case of the 650 nm laser which is commonly used. Furthermore, although one of the above-described conventional methods is capable of measuring a maximum of 10 μm, this method has the disadvantage of being incapable of measurement at a focal point.

SUMMARY OF THE INVENTION

Accordingly, the present invention has been made keeping in mind the above problems occurring in the prior art, and an object of the present invention is to provide an optical surface measuring apparatus and method which is capable of accurately measuring the minute surface status of the object to be measured using both a signal from an interferometer and an FE signal from a Position Sensitive Detector (PSD) in order to overcome the $2\pi$-ambiguity of the conventional interferometers and the limitation of the FE signal.

In order to accomplish the above object, the present invention provides an optical surface measuring apparatus, including an interferometer for radiating laser light onto a surface of an object to be measured, receiving laser light reflected from the surface, and outputting an interference signal based on distance to the surface; an object lens for transmitting the laser light radiated by the interferometer, and forming a focal point at a point of measurement on the surface of the object to be measured; an electric-powered stage for adjusting a location of the object to be measured; a beam splitter for separating the laser light reflected from the surface of the object to be measured; a collimator lens for focusing the laser light separated by the beam splitter; an astigmatic lens for transmitting the laser lens focused by the collimator lens, thereby generating astigmatism; a Focus Error (FE) signal output unit for receiving the laser light transmitted through the astigmatic lens, and outputting an FE signal based on the distance to the surface of the object to be measured; and a control unit for receiving the interference signal from the interferometer and the focus error signal from the FE signal output unit, calculating variation in the distance based on these signals, and acquiring surface status information, including height difference on the surface, from the calculated variation.

In addition, in order to accomplish the above object, the present invention provides an optical surface measuring method, including (a) radiating laser light from an interferometer onto a reference point on a surface of an object to be measured fastened to an electric-powered stage; (b) moving the object to be measured fastened to the electric-powered stage in an optical axis direction in a state in which a focal point of the laser light has been formed at the reference point on the surface of the object to be measured by an object lens; (c) while the object to be measured is being moved, inputting the laser light, reflected from the surface, to an interferometer through a beam splitter and, simultaneously, inputting laser light, separated by the beam splitter, to an FE signal output unit through a collimator lens and an astigmatic lens; (d) simultaneously receiving an interference signal based on distance to the surface from the interferometer and an FE signal based on the distance to the surface from the FE signal output unit, acquiring reference data from these two signals, and storing the reference data; and (e) radiating laser light, and, using the control unit, receiving an interference signal from the interferometer and an FE signal from the FE signal output unit, calculating variation in the distance based on the interference signal, the FE signal and the reference data and acquiring surface status information, including height difference on the surface, from the calculated variation in the distance while moving a point of measurement across the surface by moving the object to be measured in a direction perpendicular to the optical axis direction.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
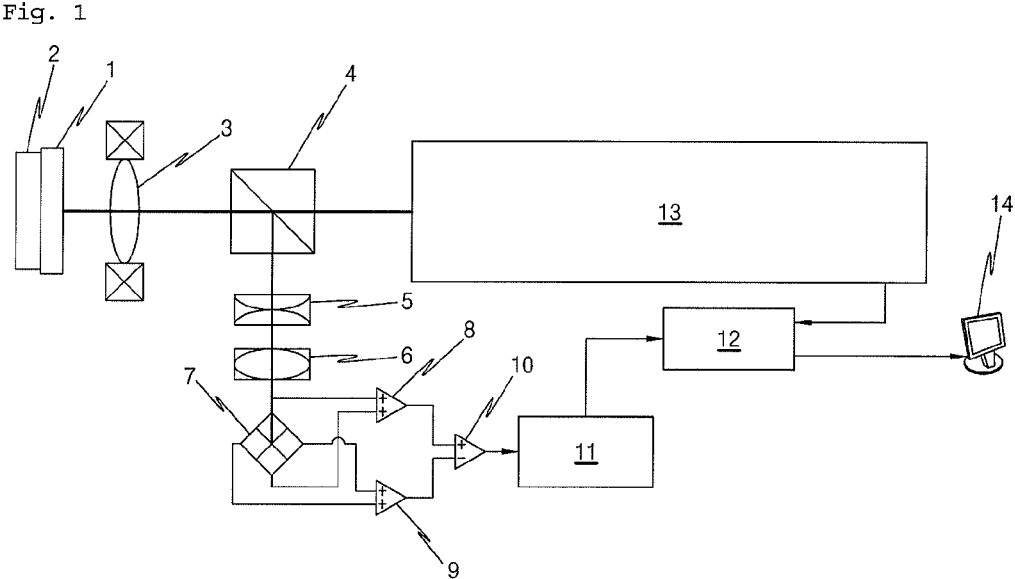
FIG. 1 is a schematic diagram showing the construction of an optical surface measuring apparatus according to a preferred embodiment of the present invention.

Reference now should be made to the drawings, in which the same reference numerals are used throughout the different drawings to designate the same or similar components.

Preferred embodiments of the present invention will be described in detail below with reference to the accompanying drawings.

The present invention relates to an optical surface measuring apparatus and method, and is directed to an optical surface measuring apparatus and method which is capable of accurately measuring surface status, such as a minute variation in height (the height difference), a protrusion, a depression, surface damage and/or surface roughness, at each point on the surface of the object to be measured using both a signal from an interferometer and an FE signal from a PSD in order to overcome the 2π-ambiguity of the conventional interferometers and the limitation of the FE signal.

For this purpose, the construction of the surface measuring apparatus according to a preferred embodiment of the present invention is shown in FIG. 1.

As shown in this drawing, the surface measuring apparatus according to the present invention includes an interferometer 13 for radiating laser light onto the surface of an object to be measured 1, receiving laser light reflected from the surface, and outputting an interference signal based on the distance to the surface, an object lens 3 for transmitting the laser light radiated by the interferometer 13, and forming a focal point at a point of measurement on the surface of the object to be measured 1, an electric-powered stage 2 for adjusting the location of the object to be measured 1, a beam splitter 4 for separating the laser light reflected from the surface of the object to be measured, a collimator lens 5 for focusing the laser light separated by the beam splitter 4, an astigmatic lens 6 for transmitting the laser lens focused by the collimator lens 5, thereby generating astigmatism, an FE signal output unit for receiving the laser light transmitted through the astigmatic lens 6, and outputting a focus error signal based on the distance to the surface of the object to be measured 1, a control unit 12 for receiving the interference signal from the interferometer 13 and the focus error signal from the FE signal output unit, calculating variation in the distance to the surface based on these signals, and acquiring surface status information, such as the height difference of the surface of the object to be measured, from the calculated variation, and a display 14 for displaying the surface status information output from the control unit 12.

Here, the FE signal output unit may include a PSD. This PSD may include a quadrant photodiode 7, or a photodiode array or a CCD array which can be divided into four regions.

In a preferred embodiment, the FE signal output unit using the quadrant photodiode 7 is shown in FIG. 1, a light quantity signal detected and output by the quadrant photodiode 7 is converted into an FE signal, which is an analog signal, through operators 8, 9 and 10, and the FE signal output from the operators 8, 9 and 10 is converted into a digital signal by an Analog-to-Digital (A/D) converter 11 and then input to the control unit 12.

In this construction, the laser light output from the interferometer 13 passes through the object lens 3, and is radiated onto the surface of the object to be measured 1 fastened onto the electric-powered stage 2.

Thereafter, the laser beam reflected from the object to be measured 1 enters the beam splitter 4 and is separated into two light beams, one of the two light beams enters the interferometer 13 again, is output in the form of an interference signal, and enters the control unit 12.

Figure 2:
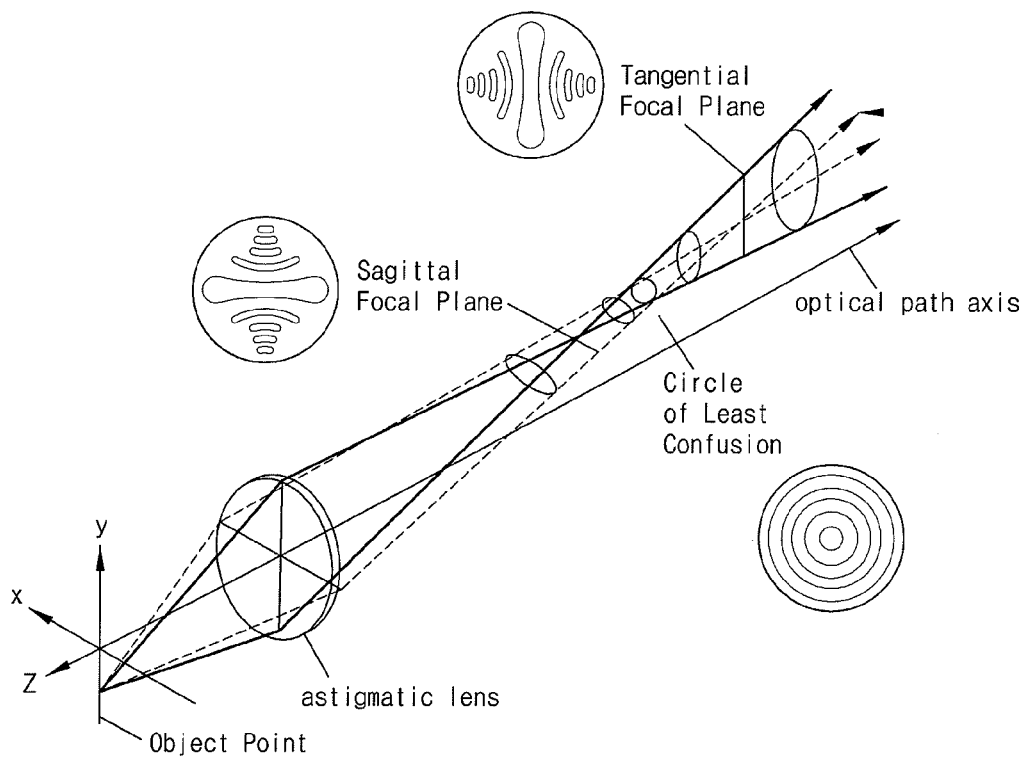
FIG. 2 is a diagram showing variation in rays of light depending on focal distance after laser light has passed through the astigmatic lens.

Meanwhile, the other light beam proceeds from the beam splitter 4 through the collimator lens 5 located below the beam splitter 4 to the astigmatic lens 6. At this time, astigmatism is generated by the astigmatic lens 6, as shown in FIG. 2. FIG. 2 is a diagram showing variation in rays of light depending on focal distance after laser light has passed through the astigmatic lens.

The laser light focused by the collimator lens 5 and then input to the astigmatic lens 6 is rounded in a circle of least confusion. The shape of the laser light changes when an object point is moved and, thus, the distance is changed in the Z axis direction (in the direction of the optical axis).

Thereafter, when the laser light passed through the astigmatic lens 6 is input to the quadrant photodiode 7, the quantities of light are detected by respective regions of the photodiode, and light quantity signals detected by respective photodiode regions are output through the operators (OP AMPs) 8, 9 and 10.

The signals output through the operators 8, 9 and 10 form an FE signal, and this FE signal is converted into a digital signal by the A/D converter 11 and input to the control unit 12.

Figure 3:
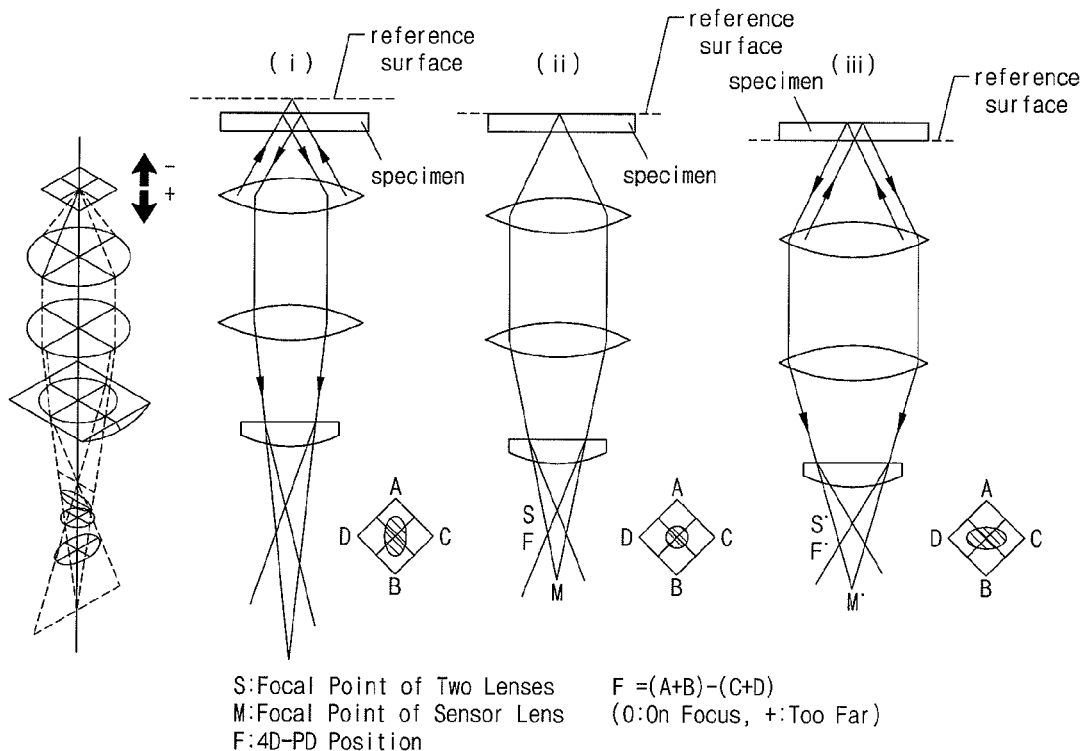
FIG. 3 is a schematic diagram illustrating the principle of a quadrant photo diode.

FIG. 3 is a diagram showing the quantity of light depending on the distance measured using an astigmatism method. This drawing shows variation in the quantity of light depending on variation in the distance to the surface of the object to be measured on the basis of an optical axis (the Z axis) (more clearly, variation in the distance to a point of measurement of the surface at which a laser beam is radiated).

Since the FE signal is a signal which changes when the surface is out of a focal point, the shape of the FE signal changes when the object to be measured 1 is moved along the optical axis on the basis of a position where a focal point was initially focused using the astigmatism method.

For example, when the object point is farther than a focal reference point, an image is formed and the image is longer along an A-B axis, as shown in FIG. 3($i$). In contrast, when the object point is closer than the focal reference point, an image is formed and is longer along a C-D axis, as shown in FIG. 3($iii$).

In this case, the signals detected and output by the quadrant photodiode 4D-PD 7 are a total of four types of signals A, B, C and D, as shown in FIG. 3, in which case the signals are combined together by the operator 8, 9 and 10 and then the FE signal is output in the form of FES=(A+B)−(C+D).

That is, the quantities of light are detected for the separate photodiode regions of the quadrant photodiode 7, and output light quantity signals are output through the operators 8, 9 and 10 in the form of the FE signal, in which case the FE signal is obtained in the form of FES=(A+B)−(C+D).

When a photodiode array or a CCD array which can be divided into four regions, instead of the quadrant photodiode, is used, signals output from the four separate regions are combined together by the operators, thereby generating the FE signal.

Accordingly, when the object point becomes farther than the focal reference point, as shown in FIG. 3($i$), a larger quantity of light is applied to the regions A+B and a smaller quantity of light is applied to the regions C+D, so that the FE signal FES is output in the form of a + signal with higher intensity. In contrast, when the object point becomes closer than the focal reference point, as shown in FIG. 3($iii$), a larger amount of light is applied to the regions C+D and a smaller amount of light is applied to the regions A+B, so that the FE signal is output in the form of a − signal with higher intensity.

The FE signal obtained through the combination by the operators 8, 9 and 10 as described above is converted into a digital signal by the A/D converter 11, and is input to the control unit 12. The control unit 12 calculates variation in the distance to the surface of the object to be measured using the FE signal converted into the digital signal and the interference signal input from the interferometer 13, and obtains minute surface status information, such as a variation in height (the height difference), a protrusion, a depression, surface damage and/or surface roughness at each point on the surface of the object to be measured, on the basis of the variation in the distance.

A process of measuring the status of a specific surface using the apparatus constructed as described above will be described below.

Figure 4:
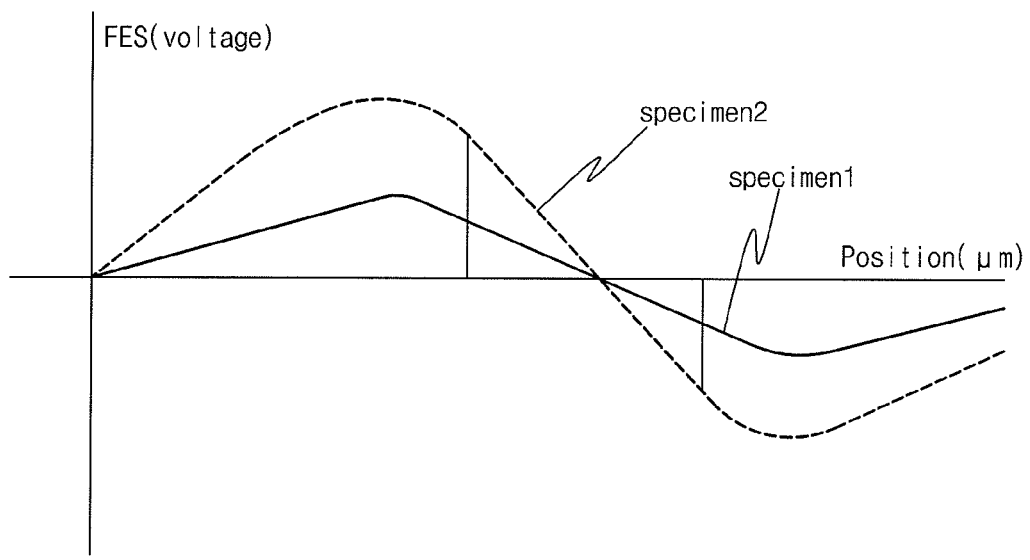
FIG. 4 is a diagram showing the variation of an FE signal depending on the type of specimen.

The curve of the FE signal varies depending on the type of object to be measured (a Si wafer, a mirror, a metal, etc.), as shown in FIG. 4. FIG. 4 is a graph showing the curves of FE signals which were obtained when objects of measurement (specimens 1 and 2) (denoted by reference numeral 1 in FIG. 1) were moved along an optical axis, that is, the Z axis. This drawing shows variation in the FE signal depending on the type of specimen.

Since the FE signal varies depending on the object to be measured as described above, a Z-axis scan process used to obtain reference data by setting a specific reference point on the surface of the object to be measured and moving the object to be measured from the reference point location along the Z-axis direction is performed first in the measuring process of the present invention.

First, a reference point is selected from the surface of the object to be measured 1 fastened to the electric-powered stage 2 in order to obtain reference data, and the interferometer 13 radiates laser light onto the reference point of the surface of the object to be measured.

While the laser light is radiated as described above, a focal point is formed at the reference point of the surface of the object to be measured through the object lens 3, and the location of the object to be measured 1 is moved in the Z-axis direction using the electric-powered stage 2, at which time the interference signal output from the interferometer 13 and the FE signal output from the FE signal output unit are input to the control unit 12 at the same time.

Figure 5:
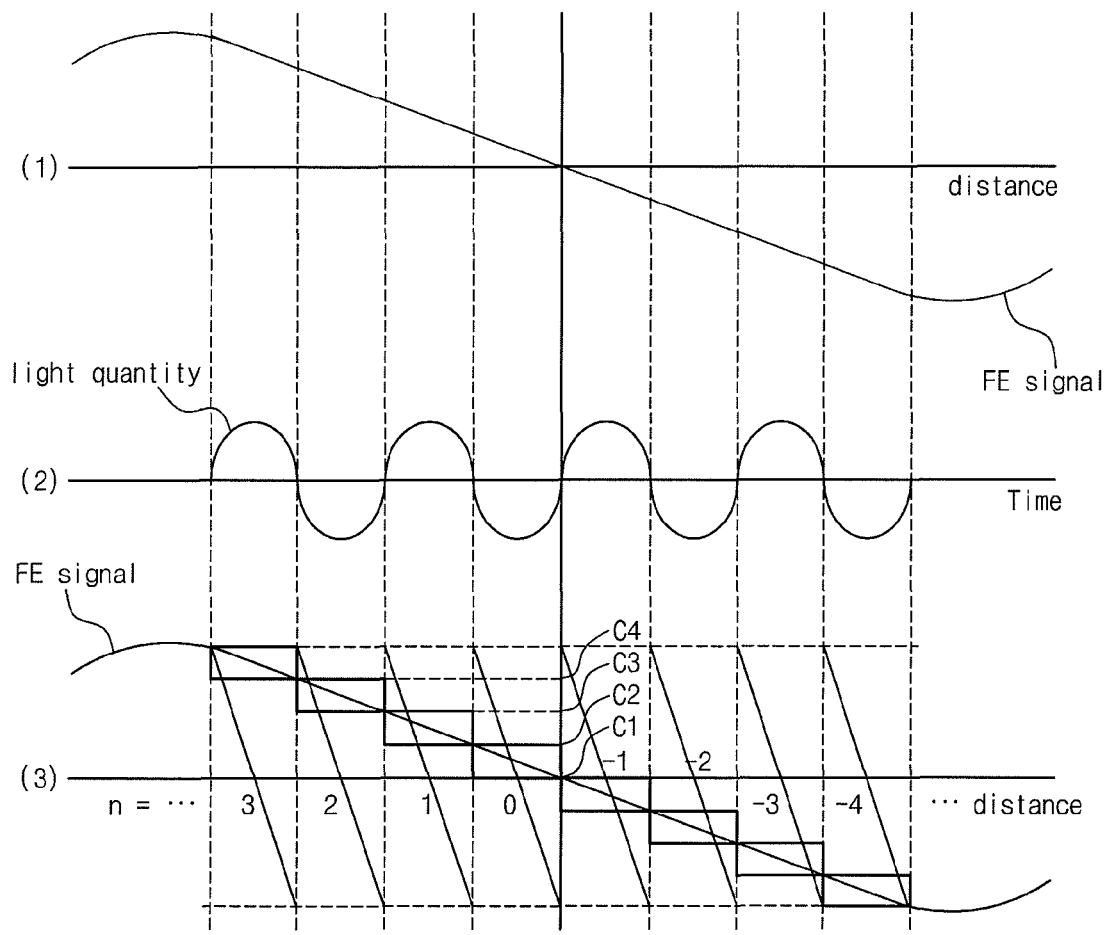
FIG. 5 is a diagram showing a signal obtained during a Z-axis scan process according to the present invention.

FIG. 5 is a diagram showing a signal obtained during the Z-axis scan process for obtaining reference data before actually measuring the surface of the object to be measured. FIG. 5(1) shows the curve of an FE signal (S-curve) created using the astigmatism method based on a combination of an astigmatic lens (denoted by reference numeral 6 in FIG. 1) and a PSD. The curve of the FE signal is dependent on the distance to the reference point on the surface of the object to be measured.

The value of the FE signal value is obtained as a voltage value depending on the distance. Prior to the measurement, the FE signal should be obtained using a Z-axis scan, as shown in FIG. 5(1).

FIG. 5(2) shows an interference signal output from the interferometer. The interference signal is converted into time-dependent variation in the distance by the control unit through calculation. When this resulting signal and the FE signal overlap each other, FIG. 5(3) is obtained.

FIG. 5(3) shows the results of unwrapping a signal, obtained through distance calculation, and an FE signal together. The signal obtained from the interference signal through distance calculation is a periodic triangular waveform signal as shown in the drawing.

The control unit extracts the data of FIG. 5, obtained as described above, and the overlapping values of the two signals (voltage values), and stores them as reference data. In particular, the overlapping values obtained in respective periods of the triangular waveform are used as threshold values for counting an n value, which will be described later.

Once the reference data has been obtained using the Z-axis scan process, the object to be measured 1 is moved in a direction perpendicular to the Z-axis direction (a direction perpendicular to the optical axis) using the electric-powered stage 2, and then actual measurement is performed to obtain the surface information of the object to be measured 1.

While the object to be measured 1 is being moved, that is, when the point of measurement is being moved across the surface, the process in which an interference signal from the interferometer 13 and an FE signal from the FE signal output unit are simultaneously input to the control unit 12 when laser light is radiated by the interferometer 13 is performed under the same conditions in the same manner.

In this case, since the FE signal has low accuracy, it is used only for counting an n value. An n value predetermined for each interval between threshold values is calculated by comparing the value of the FE signal, obtained at a point of measurement at which laser light is radiated while the object to be measured 1 is moved, with threshold values obtained during the Z-axis scan process.

That is, if in FIG. 5(3), the value of the FE signal is measured as M1, the upper and lower threshold values between which M1 is located are found by comparing M1 with the threshold values of the reference data obtained by the Z-axis scan. For example, when M1 is located between C1 and C2, the n value is 0. When M1 is located between C2 and C3, the n value is 1. Meanwhile, when M1 is located between C3 and C4, the n value is 2.

When the n value is obtained using the above-described method, the control unit 12 calculates actual variation in the distance (the height difference) from Equation (4) using the n value and variation in the distance value obtained from the interference signal during the measurement, and obtains surface status information, such as the surface height difference, from the actual variation in the distance.

$$\text{Actual variation in the distance} = \lambda/4 \times n + \text{variation in distance of interference signal} \quad (4)$$

where $\lambda$ is the laser wavelength.

The surface status information obtained as described above is output through the display 14, so that a person conducting the measurement can check the results of the measurement.

Figure 6:
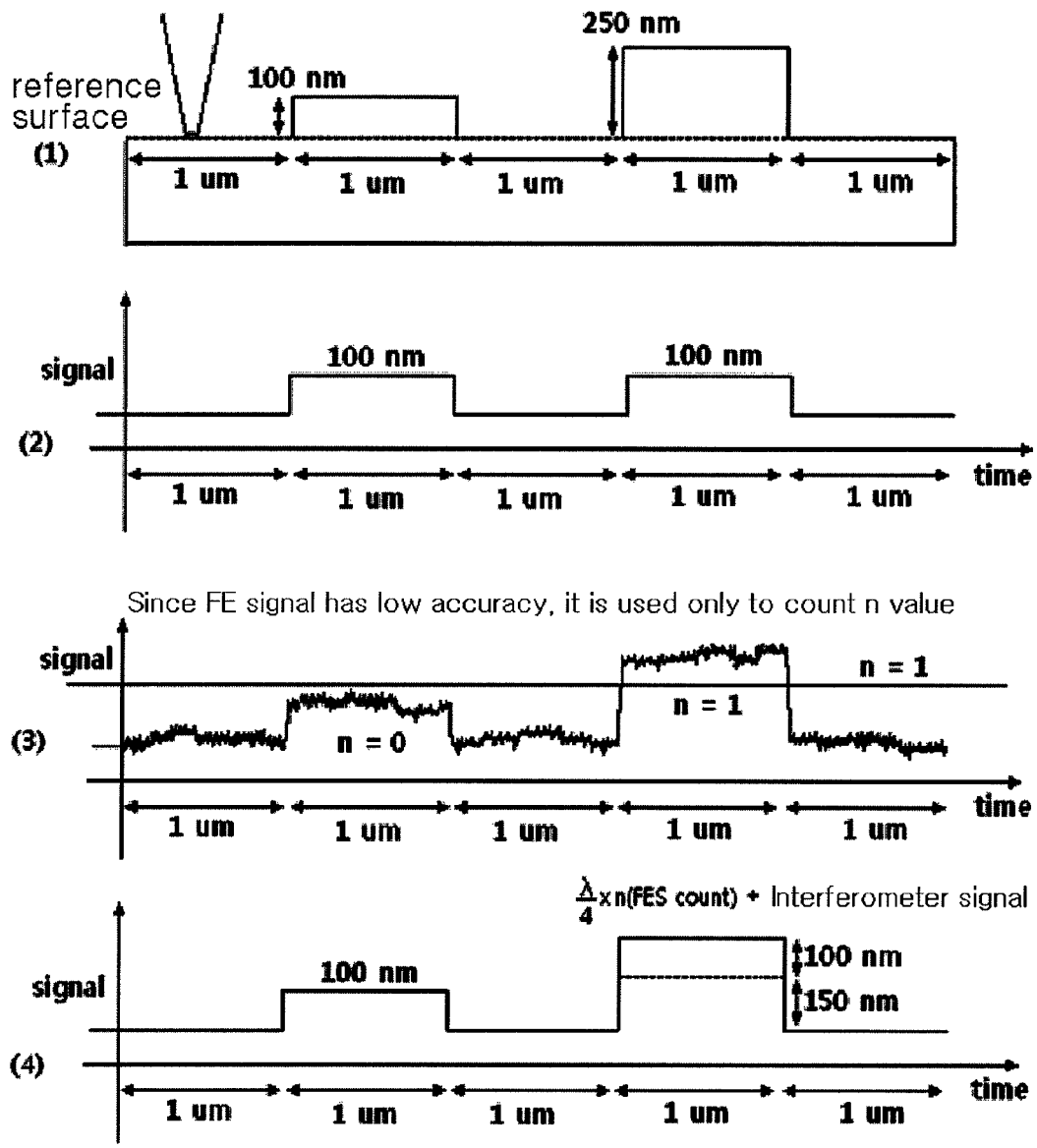
FIG. 6 is a diagram showing an example of a signal indicative of variation in the distance (the height difference) measured using an interference signal and an FE signal according to the present invention.
Figure 7:
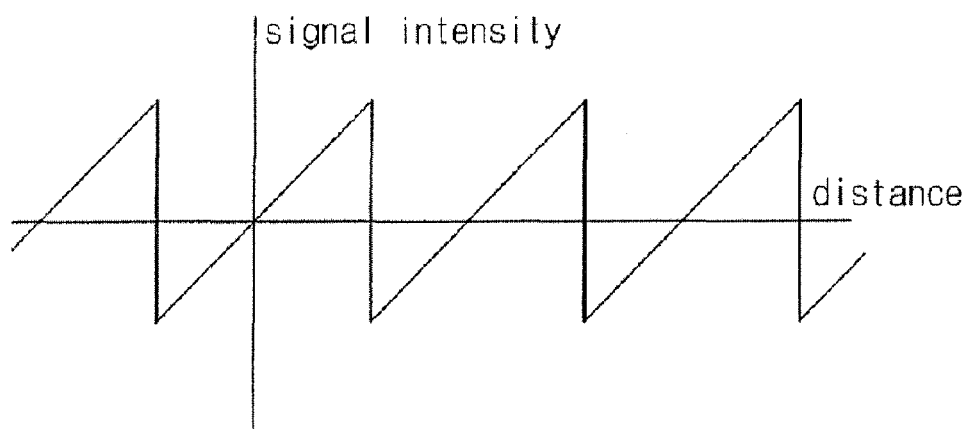
FIG. 7 is a schematic diagram illustrating the $2\pi$-ambiguity of interference.
Figure 8:
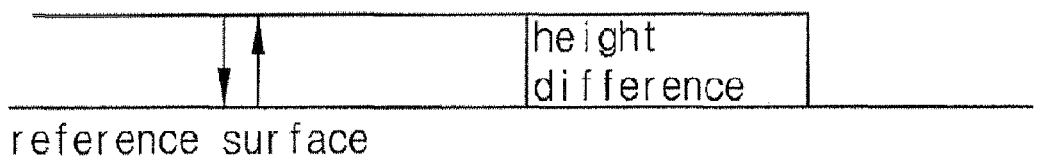
FIG. 8 is a schematic diagram showing the surface of a specimen exhibiting a height variation on the basis of a reference surface.
Figure 9:
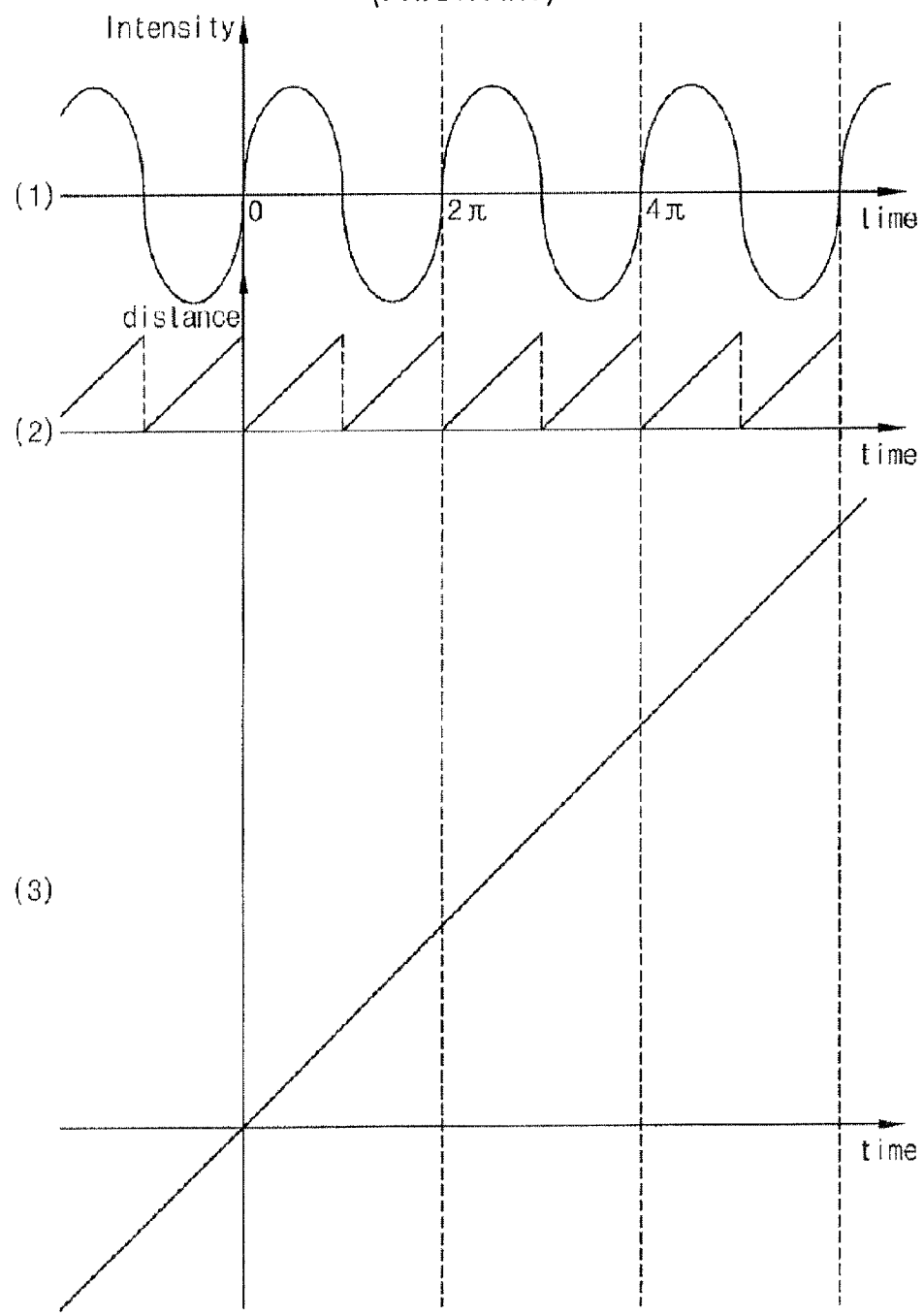
FIG. 9 is a diagram showing an interference signal measured with respect to a specimen.
Figure 10:
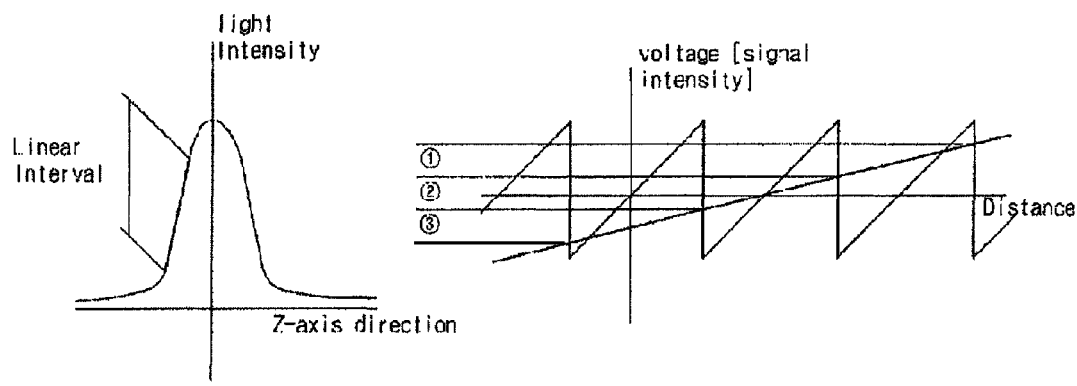
FIG. 10 is a schematic diagram illustrating a conventional method capable of measuring a maximum of 10 μm.
Figure 11:
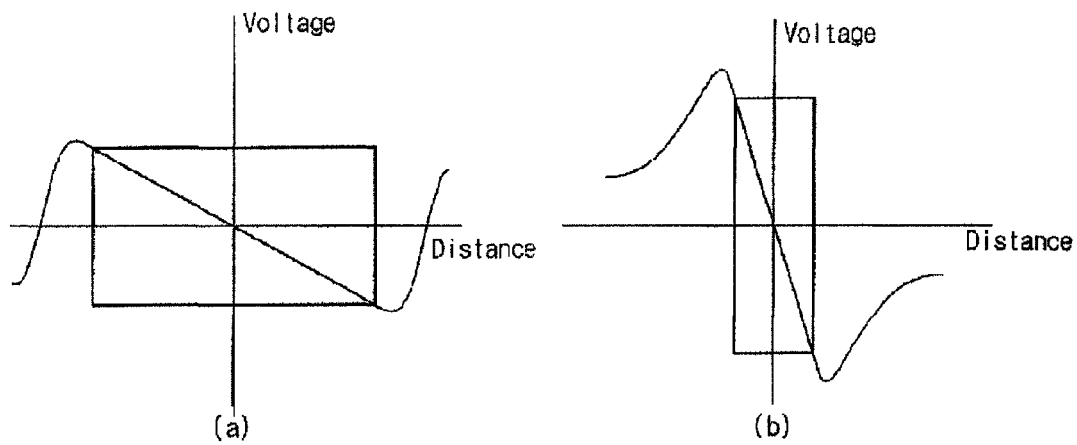
FIG. 11 is a schematic diagram illustrating a method of measuring distance using an FE signal.

FIG. 6 is a drawing showing an example of a signal indicative of the variation in the distance (the height difference) measured using the interference signal and the FE signal according to the present invention. FIG. 6(1) shows an example of the surface of an object to be measured, FIG. 6(2) shows a signal indicative of variation in the distance measured using a typical interferometer 13, FIG. 6(3) shows the FE signal, and FIG. 6(4) shows a signal indicative of variation in the distance using the interference signal and the FE signal according to the present invention.

The case where there are height differences on the surface of an object to be measured at regular intervals of 1 μm, as shown in FIG. 6, is taken as an example, and it is assumed that a reflective interferometer using a laser with a wavelength $\lambda$ of 600 nm (in the case of a He—Ne laser, a wavelength of 632 nm) is used for convenience of calculation.

From FIG. 6, it can be seen that since the wavelength of a laser beam is 600 nm, a period is repeated at every interval of 150 nm. When the height difference is abruptly changed to 250 nm, as shown in FIG. 6(1), a height difference of 250 nm is measured as 100 nm, exclusive of 150 nm, as shown in FIG. 6(2), in the case where only the signal from the interferometer is used.

In contrast, in the present invention, when the height difference is 100 nm on the surface pattern of FIG. 6, n=0, so that the height difference is measured as 100 nm using only a signal from the interferometer. Since at a fourth point of measurement (where the actual height difference is 250 nm), n=1, so that 250 nm can be accurately obtained by adding 100 nm, obtained from the signal from the interferometer, to $\lambda/4$=600/4=150 nm.

When only a signal from an interferometer is used, every height difference is read as 100 nm during phase unwrapping in the case where there is a point at which the variation in height is equal to or greater than λ/4. In contrast, in the present invention, an n value is acquired from an FE signal using reference data acquired through a Z-axis scan performed on a reference surface, and the accurate height difference can be calculated based on the n value and the signal from the interferometer.

That is, the sequential position of a corresponding period in the signal from an interferometer is determined by obtaining the n value, and a final resulting value can be obtained by adding a height of λ/4×n to the height difference obtained from the signal from the interferometer.

As described above, according to the present invention, the actual height can be read without ambiguity with the interferometer being maintained at high resolution.

As a result, according to the optical surface measuring apparatus and method of the present invention, both a signal form an interferometer and a focus error signal from a PSD are used, so that advantages arise in that the 2π-ambiguity of the conventional interferometer and the limitation of the focus error signal can be overcome and the minute surface status of the object to be measured can be more accurately measured.

In particular, in the present invention, a focus error signal with low accuracy is used for the determination of the period of the interferometer signal and actual minute variation in the height of a surface is measured from a signal of the interferometer using the determined period, so that a more accurate measurement value can be read while the interferometer is maintained at high resolution.

Furthermore, in the conventional technology, only the linear interval of one surface located out of a focal point is used, so that the lateral resolution is deteriorated, the ambiguity-overcoming distance is short, and the overcoming distance is dependent on an object lens used to measure a surface. That is, when an object lens of high magnifying power is used, the lateral resolution is improved, but the ambiguity-overcoming distance is decreased. Meanwhile, when an objective lens of low magnifying power is used, the ambiguity-overcoming distance can be increased, but lateral resolution is decreased. In contrast to this, in the present invention, with regard to an FE signal, a negative value and a positive value are distinguished from each other on the basis of the focal point, so that the ambiguity over a relatively wide range (a range of a minimum of 30 μm) can be overcome, as compared to the conventional technology. Furthermore, since there is no direct relationship between the generation of an FE signal and the lateral resolution of the apparatus and measurement can be performed at the focal point, measurement can be performed without influencing lateral resolution. Moreover, since there is no process of adjusting a confocal point using a pinhole or the like, optical alignment is relatively easy. In the conventional technology, a pinhole size and location should be adjusted to the characteristics of an apparatus due to the problem of the location of a confocal point location which varies depending on an object lens, whereas in the present invention, use is enabled by simple addition of an FE signal generation device, so that the present invention is easy to use in fields of industry.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical surface measuring apparatus, comprising:
an interferometer for radiating laser light onto a surface of an object to be measured, receiving laser light reflected from the surface, and outputting an interference signal based on distance to the surface;
an object lens for transmitting the laser light radiated by the interferometer, and forming a focal point at a point of measurement on the surface of the object to be measured;
an electric-powered stage for adjusting a location of the object to be measured;
a beam splitter for separating the laser light reflected from the surface of the object to be measured;
a collimator lens for focusing the laser light separated by the beam splitter;
an astigmatic lens for transmitting the laser light focused by the collimator lens, thereby generating astigmatism;
a Focus Error (FE) signal output unit for receiving the laser light transmitted through the astigmatic lens, and outputting an FE signal based on the distance to the surface of the object to be measured; and
a control unit for receiving the interference signal from the interferometer and the focus error signal from the FE signal output unit, calculating variation in the distance based on these signals, and acquiring surface status information, including height difference on the surface, from the calculated variation, wherein the control unit overlaps a periodic distance variation signal obtained from the interference signal from the interferometer and the FE signal, and acquires overlapping values of the two signal values as the reference data.

2. The optical surface measuring apparatus as set forth in claim 1, wherein the FE signal output unit comprises:
a Position Sensitive Detector (PSD) for detecting a quantity of light based on the distance to the surface of the object to be measured;
operators for converting light quantity signals, detected by the PSD, into an FE signal; and an analog-to-digital (A/D) converter for converting the analog FE signal, output from the operators, into a digital signal, and outputting the digital signal.

3. The optical surface measuring apparatus as set forth in claim 2, wherein the PSD comprises a quadrant photodiode for detecting the quantity of light, and the signals output from separate photodiode regions of the quadrant photodiode are combined into the FE signal by the operators.

4. The optical surface measuring apparatus as set forth in claim 2, wherein the PSD comprises any one of a photodiode array and a Charge-Coupled Diode (CCD) array which can be divided into four regions, and the signals output from the separate photodiode regions of the quadrant photodiode are combined into the FE signal by the operators.

5. The optical surface measuring apparatus as set forth in claim 1, further comprising
a display for displaying the surface status information output from the control unit.

6. An optical surface measuring method, comprising the steps of:
(a) radiating laser light from an interferometer onto a reference point on a surface of an object to be measured fastened to an electric-powered stage;
(b) moving the object to be measured fastened to the electric-powered stage in an optical axis direction in a status in which a focal point of the laser light has been formed at the reference point on the surface of the object to be measured by an object lens;

(c) while the object to be measured is being moved, inputting the laser light, reflected from the surface, to an interferometer through a beam splitter and, simultaneously, inputting laser light, separated by the beam splitter, to a Focus Error (FE) signal output unit through a collimator lens and an astigmatic lens;

(d) simultaneously receiving an interference signal based on distance to the surface from the interferometer and an FE signal based on the distance to the surface from the FE signal output unit, acquiring reference data from these two signals, and storing the reference data; and (e) radiating laser light, and, using the control unit, receiving an interference signal from the interferometer and an FE signal from the FE signal output unit, calculating variation in the distance based on the interference signal, the FE signal and the reference data and acquiring surface status information, including height difference on the surface, from the calculated variation in the distance while moving a point of measurement across the surface by moving the object to be measured in a direction perpendicular to the optical axis direction, wherein the control unit overlaps a periodic distance variation signal obtained from the interference signal from the interferometer and the FE signal, and acquires overlapping values of the two signal values as the reference data.

7. The optical surface measuring method as set forth in claim 6, wherein the overlapping values of the two signals are acquired in respective periods of the distance variation signal.

8. The optical surface measuring method as set forth in claim 6, wherein at the step (d), the control unit determines specific threshold values between which the FE signal falls by comparing the FE signal with threshold values using overlapping values of the two signals as the threshold values, calculates an n value, corresponding to an interval between the specific upper and lower threshold values, from among n values predetermined for respective intervals between the upper and lower threshold values, and calculates actual variation in the distance using the calculated n value and the variation in the distance obtained from the interference signal.

9. The optical surface measuring method as set forth in claim 8, wherein the actual variation in the distance is obtained from the following Equation using the n value and the variation in the distance obtained from the interference signal:

$$\text{actual variation in distance} = \lambda/4 \times n + \text{variation in distance obtained from interference signal.}$$

10. The optical surface measuring method as set forth in claim 6, further comprising the step of displaying the surface status information, output from the control unit, using a display so that a person conducting the measurement can check results of the measurement.

* * * * *